D. B. RAWORTH.
CORN HARVESTER.
APPLICATION FILED AUG. 17, 1909.
970,266.
Patented Sept. 13, 1910.
5 SHEETS—SHEET 1.
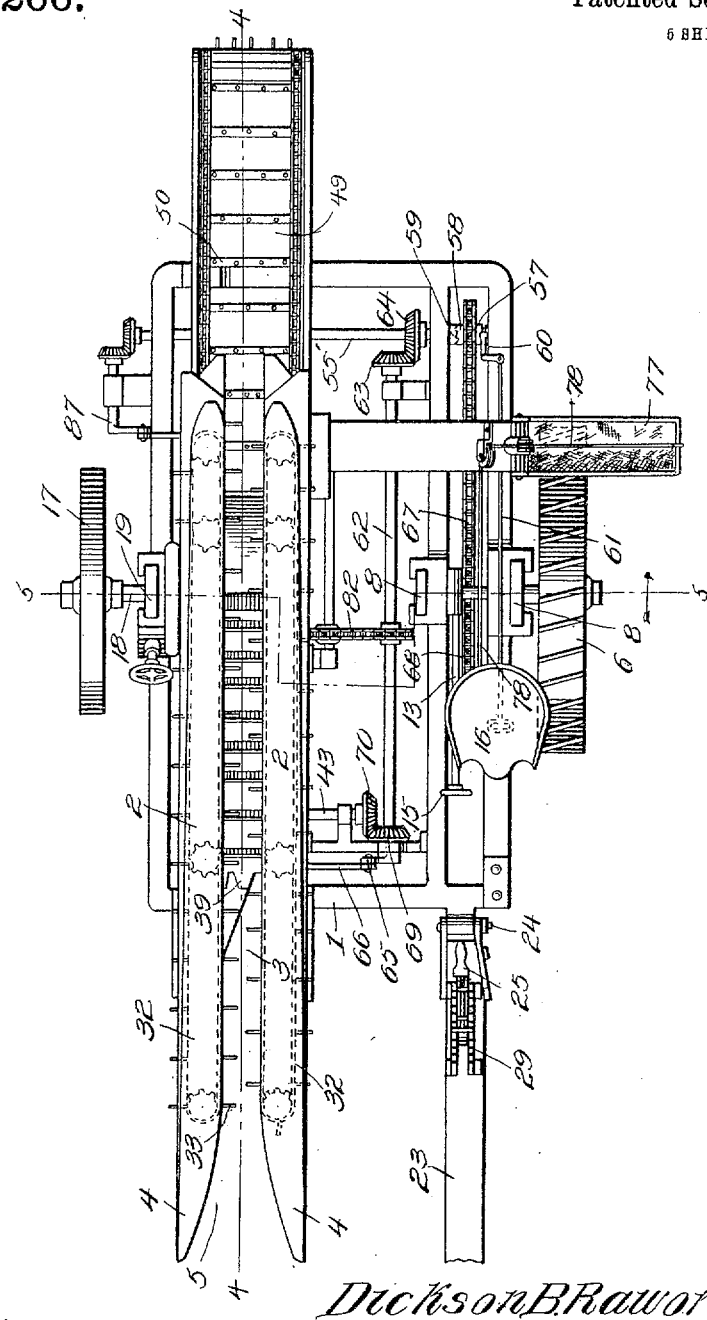
Witnesses
Frank Hough
C. C. Hines.
Inventor
Dickson B. Raworth,
By Victor J. Evans
Attorney

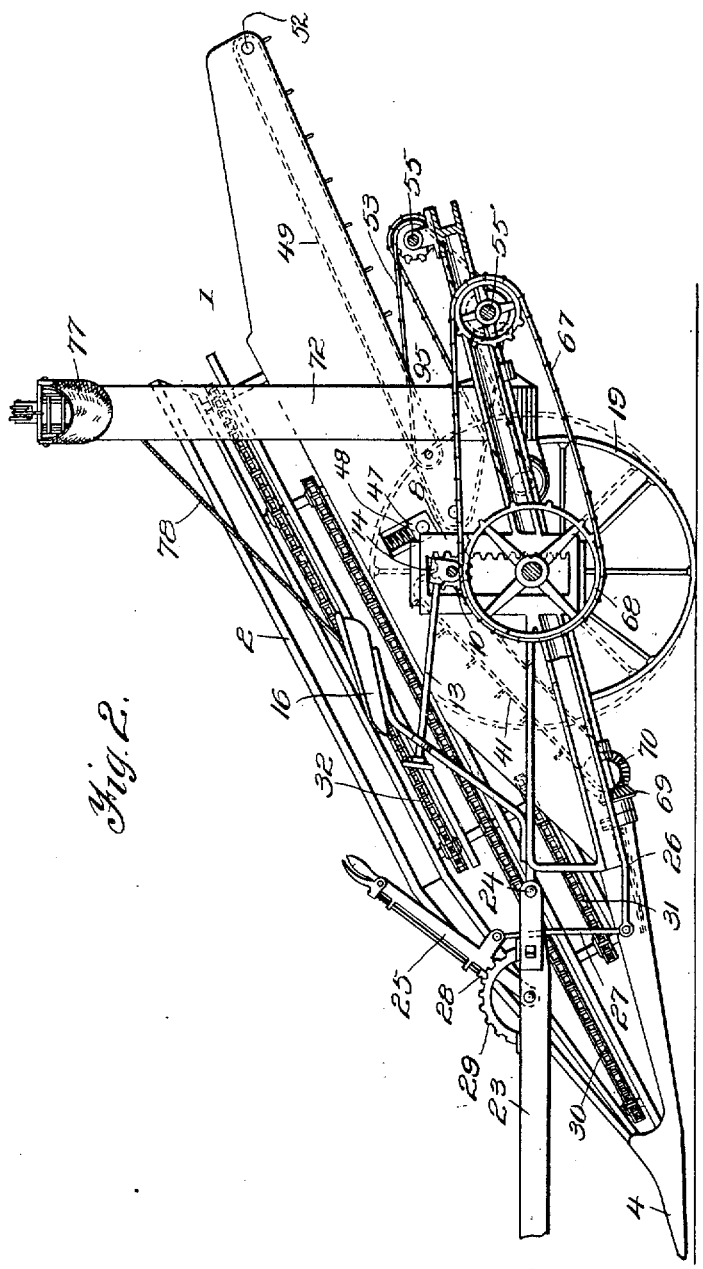

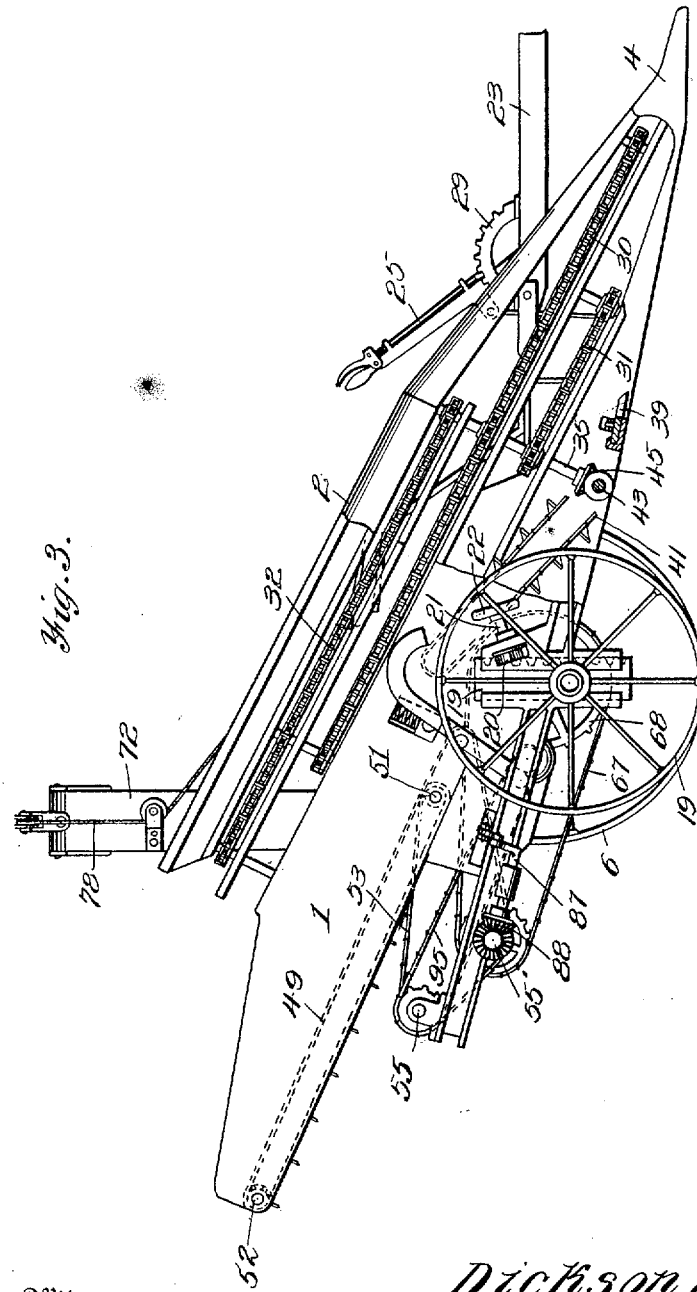

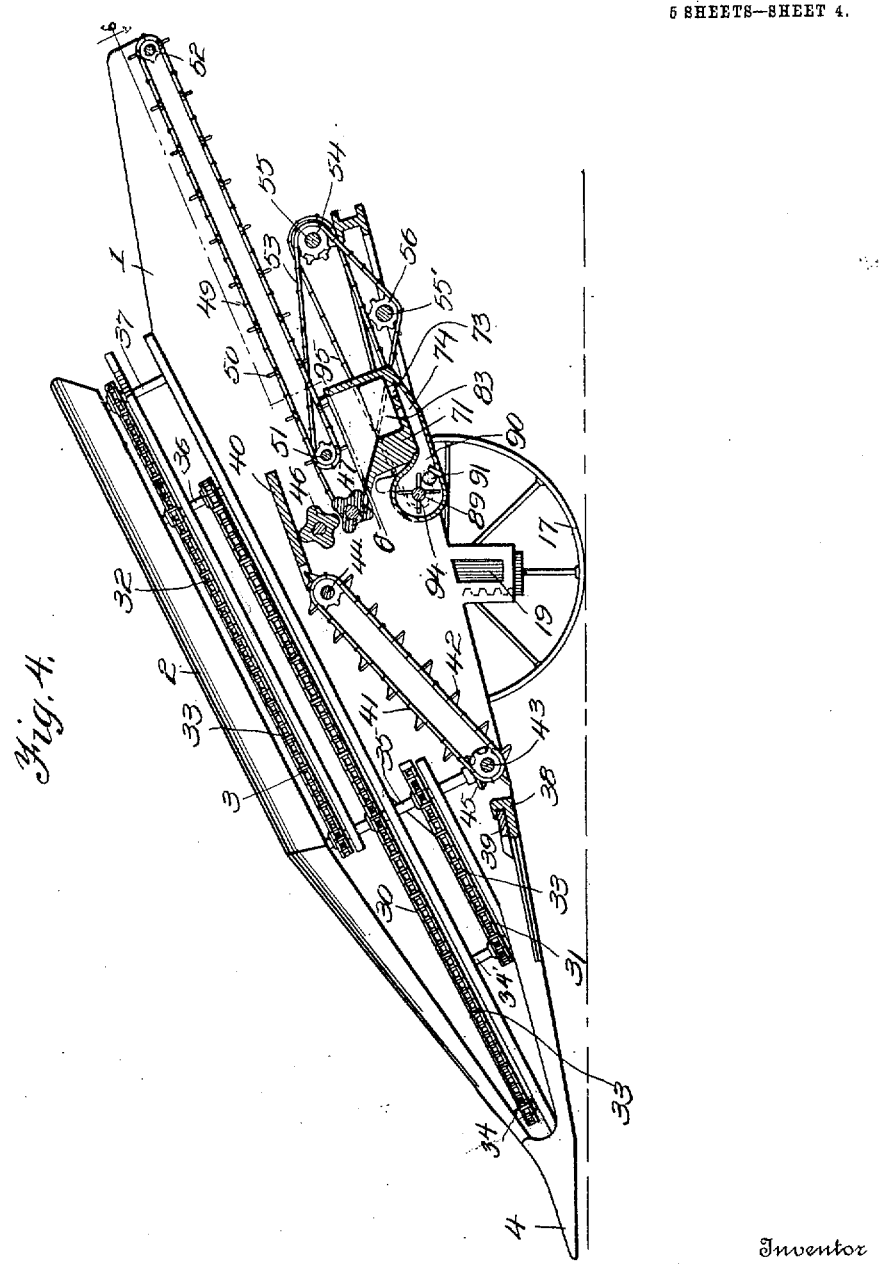

D. B. RAWORTH.
CORN HARVESTER.
APPLICATION FILED AUG. 17, 1909.
970,266.
Patented Sept. 13, 1910.
5 SHEETS—SHEET 5.
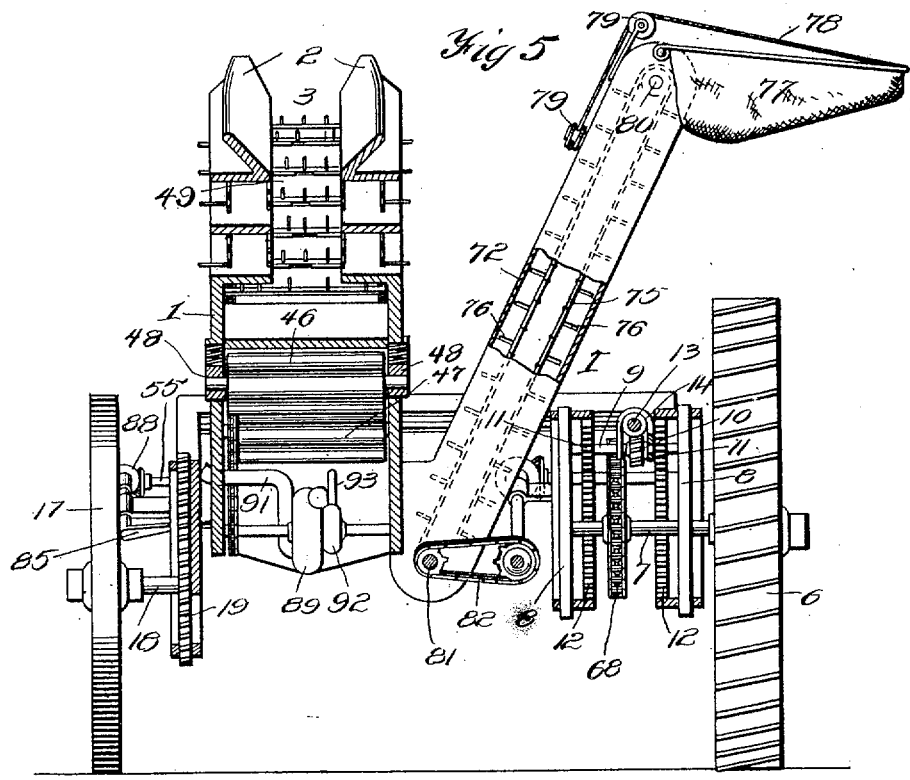
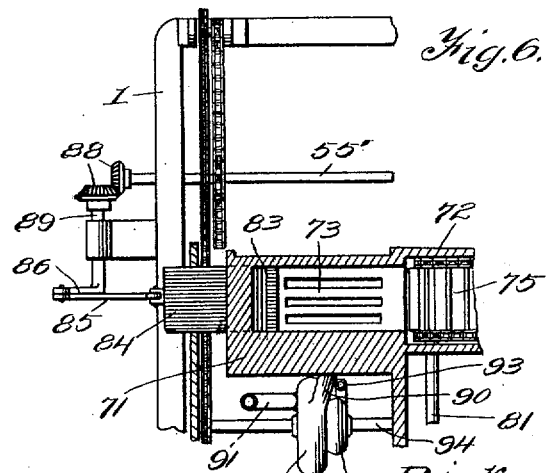
Witnesses
Frank Hough
C. C. Hines
Inventor
Dickson B. Raworth,
By Victor J. Evans
Attorney

UNITED STATES PATENT OFFICE.

DICKSON B. RAWORTH, OF BROWNSVILLE, TENNESSEE.

CORN-HARVESTER.

970,266.  Specification of Letters Patent.  Patented Sept. 13, 1910.

Application filed August 17, 1909. Serial No. 513,212.

*To all whom it may concern:*

Be it known that I, DICKSON B. RAWORTH, a citizen of the United States, residing at Brownsville, in the county of Haywood and State of Tennessee, have invented new and useful Improvements in Corn-Harvesters, of which the following is a specification.

This invention relates to corn harvesters, the object of the invention being to provide a machine for cutting the standing stalks, separating the ears therefrom, depositing the stripped stalks upon the ground, and separating the ears and corn which may be shelled therefrom and delivering the same into separate receptacles.

A further object of the invention is to provide a machine in which the gathering devices may be conveniently raised and lowered and tilted for effective action upon high, low and leaning stalks, as well as to provide a novel construction of drive gearing for the several parts of the machine which may be readily and easily controlled.

A still further object of the invention is to provide a novel construction of means for recovering, cleaning and separating the shelled corn from dust and other foreign substances and delivering the same into a separate receptacle from the ears, so as to prevent the loss of such corn and discharge it in marketable condition.

A still further object of the invention is to provide means for temporarily preventing discharge of the ear corn from its delivery elevator or conveyer at times, as at the end of rows, when a wagon employed as a receiver cannot conveniently follow the path of the machine.

With these and other objects in view, the invention consists of the features of construction, combination and arrangement of parts hereinafter fully described and claimed, reference being had to the accompanying drawings, in which:—

Figure 1 is a top plan view of a corn harvester embodying my invention. Fig. 2 is a side elevation of the same with parts in section. Fig. 3 is an opposite side elevation with parts in section. Fig. 4 is a vertical longitudinal section on line 4—4 of Fig. 1. Fig. 5 is a vertical transverse section on line 5—5 of Fig. 1. Fig. 6 is a fragmentary horizontal section on line 6—6 of Fig. 4.

Referring to the drawings, 1 designates the frame of the machine, which may be of suitable construction, and is provided with the usual spaced parallel guards 2 for the gathering devices, which guards form a stalk feed passage 3 and are provided at their forward ends with the divergent gathering points 4 producing a flaring throat or entrance 5 to said passage, said guards being arranged upon the grain side of the machine in the customary manner.

The frame is supported on the stubble side by a spurred traction wheel 6 mounted upon a driving axle 7 journaled in vertically movable bearing bars 8 slidably mounted on the frame, said bars having journaled therein a shaft 9 carrying a worm pinion 10 and spur pinions 11, which latter mesh with rack bars 12 on the frame. An adjusting shaft 13 is mounted on the frame and carries a worm 14 meshing with the gear 10, whereby upon the rotation of said shaft in one direction or the other the stubble side of the frame may be raised or lowered upon the axle 7. The shaft 13 extends forwardly and is provided with a hand wheel 15 arranged adjacent the driver's seat 16 by which it may be readily operated. The opposite side of the frame is mounted upon a grain wheel 17 mounted upon a spindle or axle 18 carried by a rack-toothed bar or bracket 19 vertically slidable on the frame, the teeth of which bar are inclined to mesh with a worm gear 20 carried by a shaft 21 having an operating handle 22 by which the frame may be raised and lowered on the bracket, the angular relation of the teeth of the bracket and gear serving to lock the parts in adjusted position. A tongue or other suitable draft appliance 23 is connected with the forward end of the stubble side of the machine by a pivot bolt 24 and carries a pivoted lever 25 connected with a bracket 26 on the front end of the frame below the pivot bolt by a link 27, whereby the frame may be vertically tilted on the supporting wheels as a pivot. The lever is provided with a spring actuated pawl 28 to engage a rack 29 on the tongue, whereby the frame may be secured in any of its tilted positions. The frame may thus be raised, lowered or tilted to dispose the gathering devices for action upon high, low or leaning corn, as well as to suit any irregularities of the surface of the field.

The gathering devices are arranged between and extend longitudinally of the guards and comprise oppositely disposed pairs of main gatherers 30, lower gatherers 31 and upper gatherers 32, each consisting of an endless sprocket chain provided with stalk engaging or gathering fingers 33 arranged upon the working stretches of the chain to project into the gathering passage 3. These chains pass around sprocket wheels on shafts 34, 34', 35, 36 and 37 and are inclined upwardly and rearwardly, as shown. Mounted to reciprocate in a transverse guide 38 arranged below the chains 31 is a sickle or cutting knife 39, which operates to sever the gathered stalks at a suitable elevation above the surface of the ground, whereupon the freed stalks will be carried upwardly and rearwardly by the gathering devices. The gathering chains 30 are arranged intermediate the chains 31 and 32 and extend from the inner end of the throat 5 to a point near the rear end of the passage 3, while the chains 31 extend from a point in rear of the forward ends of said chains 30 to a point about midway of the length thereof, while the chains 32 extend from such point beyond the rear ends of the chains 30 to the rear end of the passage 3, the arrangement of the chains with respect to the cutting knife 9 being such that at the moment the knife engages a set of gathered stalks the latter will be held and supported by the fingers of all three sets of chains, thus enabling the stalks to be positively and cleanly severed. A guide board or shelf 40 extends across the passage 3 adjacent the rear ends of the gathering chains 30 and forms an intervening space for the passage of the stalks to the rear portion of the machine. The gathering chains feed the severed stalks at an upward and rearward inclination, whereby through the arrangement of the chains they are gradually brought to a nearly horizontal position. Immediately after the stalks have been severed by the cutting knife 39, and as they are about to be freed by the fingers of the chains 31, their butts are engaged by an upwardly and rearwardly inclined primary feed chain 41 extending between the cutting knife and cutting edge of the shelf 40, said feed chain being provided with pointed inclined teeth 42 to positively engage and feed the stalks rearward, during which time their upper ends are engaged and carried rearwardly by the fingers of the gathering chains 30 and 32. The feeder 41 passes around sprocket wheels on transverse shafts 43 and 44, the shaft 43 being connected with the shaft 35 by intermeshing beveled gears 45.

Arranged below the shelf 40 are snapping rolls 46 and 47, the shaft of the upper roll being journaled in the usual yielding, spring pressed bearings 48. The stalks fed rearwardly over the shelf 40 fall upon a secondary feed chain 49 arranged between the snapping rolls and the rear end of the feeder frame in a plane below the shelf, said chain being provided with fingers 50 to engage the stalks and feed them forwardly between and through the snapping rolls, by which the ears of corn will be separated from the stalks, while the latter will be deposited upon the ground at a point in advance of the rolls and beneath the lower end of the feeder 41. The feeder 49 passes around sprocket wheels on transverse shafts 51 and 52, the shaft 51 being provided with another sprocket around which passes a looped drive chain 53, which also engages a sprocket on the shaft of the snapping roll 47 and a sprocket wheel 54 on a transverse drive shaft 55, the lower stretch of the drive chain also passing around a drive sprocket 56 on a main drive shaft 55', whereby said chain 53 and the shaft 55 are driven. If desired, the lower snapping roll only of the pair of rolls may be driven, as described, or the two rolls may be geared to rotate positively in unison in the usual way. The shaft 55' carries at one end a sprocket wheel 57 loosely mounted thereon and having a toothed hub or clutch member 58 to engage a toothed clutch member 59 on said shaft, by which it may be fixed thereto, the hub 58 being annularly grooved to receive the forked arm of a bell crank shipper lever 60 connected with an operating rod 61 adapted to be actuated by the driver from the seat 16 to throw the gear into and out of connection with the shaft. A transmission shaft 62 extends longitudinally of the frame and carries at its rear end a beveled gear 63 meshing with a corresponding gear 64 on the shaft 55, whereby it is driven from the latter. The forward end of the shaft 62 has a wrist pin or crank 65 connected with a pitman rod 66 coupled to the cutting knife 39, whereby the latter is reciprocated. A main drive chain 67 connects the shaft 55' with a main drive sprocket wheel 68 on the driving axle 7, whereby motion is transmitted to the shaft 55' from which all of the parts of the machine are driven. On the forward end of the shaft 62 is also a beveled gear 69 meshing with a corresponding gear 70 on the shaft 43 which drives the primary feeder 41 and through its gear connections 45 with the shafts 35 imparts motion to the gathering chains 30, 31 and 32. By means of the clutch connection between the shaft 55 and sprocket 57 the operating parts of the apparatus may be simultaneously thrown into and out of action, as will be readily understood.

Arranged below and in rear of the snapping rolls is a transverse separating chamber or casing 71 having a flaring or funnel shaped mouth into which the ears separated from the stalks by the rolls fall and pass by gravity into the bottom of the casing which serves as a channel communicating at one end with the lower end of an inclined conveyer pipe or casing 72 through which the ears are discharged from the machine. The bottom of this channel is formed by a slotted wall or screen 73 forming a partition between the channel and a duct or passage 74. Arranged within the casing 72 is an endless flexible delivery conveyer 75 provided with cross slats 76 to engage the ears of corn and carry them to the upper end of said casing from which they discharge into a pivoted flexible spout 77 which when in lowered position permits the ears to drop therefrom into the body of a receiving wagon driven parallel with the stubble side of the machine. The spout is supported and may be raised and lowered by means of a rope or cable 78 connected at one end thereto and passing forwardly over guide pulleys 79 to a position adjacent the driver's seat, at which point the free end of said cable may be secured to a suitable portion of the frame so that it may be manipulated by the driver to raise and lower the spout as occasion requires. By elevating the spout the discharge of the ears therefrom may be temporarily arrested when the machine is turning around at the ends of rows or traveling at points where it cannot be conveniently followed by the receiving wagon. The conveyer 75 passes around sprockets on upper and lower shafts 80 and 81 journaled on the casing 72, the shaft 81 being connected with and driven from the shaft 62 by a sprocket chain 82.

In the action of the snapping rolls some of the kernels of corn may be shelled from the ears, which may be also partially husked and the loose kernels and separated portions of the husks will fall with the ears into the casing 71. The ears and separated portions of the husks are discharged from the separating chamber or casing onto the lower end of the slatted delivery conveyer 75 through the action of a reciprocating discharge device or plunger 83 having an outwardly extending sliding stem 84 projecting from the end of the casing opposite the delivery conveyer and connected by a pitman rod 85 with a crank 86 on a shaft 87 connected with the shaft 55' by intermeshing beveled gears 88. Through the agitative action of this plunger, the kernels are loosened up and separated from the ears and husks and dropped through the screen bottom 73 into the channel 74 which communicates with an exhaust or suction fan 89 through a duct 90, whereby the kernels will be drawn into the fan casing and discharge through a nozzle 91, to which a bag or other receptacle may be secured to receive the discharging grain. If desired, a blast fan or blower 92 having an outlet 93 may be provided to force a blast of air over or under the screen 73 to further increase the separating action and to cleanse the kernels of corn of dust and other impurities. The blower fans are mounted upon a common shaft 94 driven from the shaft 55 by a sprocket chain 95.

It will thus be understood that in the operation of the machine the gathered stalks will be cut and conveyed in an efficient manner to the snapping rolls, which will remove the ears therefrom and discharge the stalks upon the ground, and that the ears with any particles of the husks and kernels of corn which may be separated therefrom by the rolls will pass into a separating chamber from which the ears will be discharged in one direction and the loose kernels in another direction into separate receptacles, the loose kernels of corn being cleansed so that they will be discharged in marketable condition. It will also be seen that a simple construction of parts is provided for effecting these results, and that the machine may be readily and conveniently adjusted as occasion requires to suit the character of the ground or the corn which is being harvested in order that the corn may be gathered in a rapid and efficient manner and without liability of crushing or injuring the ears.

I claim:—

1. A corn harvester embodying a frame, main gathering chains, upper gathering chains extending from points intermediate the lengths of the main gathering chains to points rearwardly beyond the same, lower gathering chains arranged to overlap the front portions of the main and upper gathering chains, a cutter arranged to operate upon the stalk at the time it is engaged by all of said gathering chains, snapping rolls, a conveyer operating in conjunction with the main and upper gathering chains for feeding the stalks rearwardly beyond the rolls, a second conveyer adapted to receive the freed stalks and feed the same forwardly to the rolls, and means for operating the several parts.

2. A corn harvester embodying a frame, gathering devices mounted thereon, a cutter for severing the stalks, a rearwardly movable primary feeder, snapping rolls arranged adjacent the rear end of said feeder, a forwardly movable secondary feeder for receiving the stalks from the primary feeder and carrying the same to the snapping rolls, a shelf overhanging the snapping rolls and forming a passage for the stalks between the primary and secondary feeders, means for discharging the product, and means for operating the working parts.

3. A corn harvester embodying a frame, a plurality of superposed overlapping gathering devices mounted upon the frame, a cutter arranged to operate upon the stalk at the time it is engaged by all of said gathering devices, snapping rolls, a conveyer operating in conjunction with certain of the gathering devices for feeding the stalks rearwardly beyond the rolls, a second conveyer adapted to receive the freed stalks and feed the same forwardly to the rolls, and means for operating the several parts.

In testimony whereof I affix my signature in presence of two witnesses.

DICKSON B. RAWORTH.

Witnesses:
T. O. HOLLOWAY, Jr.,
J. H. KING.